Oct. 3, 1967

D. E. McGEACHY 3,344,802

FLUID VALVE

Filed Dec. 19, 1966

INVENTOR
DONALD E. McGEACHY
BY
Barnes, Kisselle,
Raisch & Choate
ATTORNEYS

United States Patent Office 3,344,802
Patented Oct. 3, 1967

3,344,802
FLUID VALVE
Donald E. McGeachy, Highland, Mich., assignor to Numatics Incorporated, Highland, Mich., a corporation of Michigan
Filed Dec. 19, 1966, Ser. No. 602,885
10 Claims. (Cl. 137—270)

This invention relates to a fluid valve and more particularly to a rotary actuator for a fluid valve operable in a lineal motion.

It is an object of the present invention to provide a valve control which is of such a nature that it can be sealed to keep out dirt from the valve structure and which is versatile in its operation in that it can be operated either in a clockwise or counterclockwise direction or both. In addition, it is a control that has a considerable amount of overtravel so that the valve can be positively actuated to any degree desired.

A further object of the invention is a control device which can be readily rotated to any quadrant on a valve housing to receive the operating motion, thus making it possible to position a valve in a number of ways and still receive the benefit of the operating cam.

It is another object of the invention to provide a structure which can be readily adapted to either counterclockwise or clockwise operation by a simple internal mechanism which visually indicates its characteristic to an adjusting operator.

Other objects and features of the invention will be apparent in the following description and claims wherein the principle of the invention is set forth together with the best mode contemplated for carrying out the invention.

Figure 1:
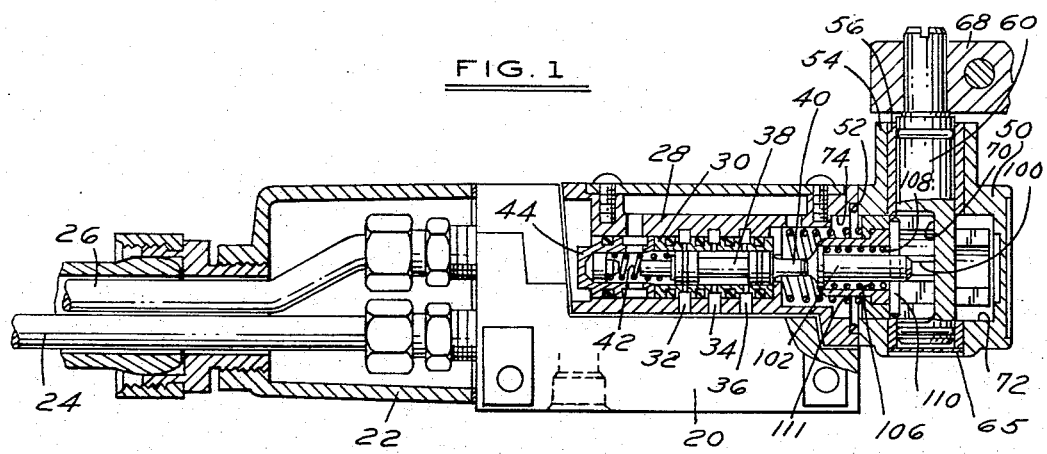

Drawings accompany the disclosure and the various views thereof may be briefly described as:

FIGURE 1, a sectional view showing a valve and control unit.

Figure 2:
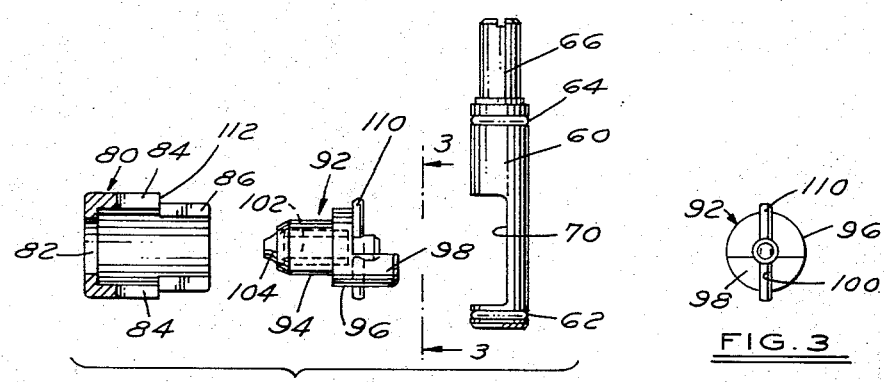

FIGURE 2, an exploded view of the operating elements of the valve.

Figure 3:
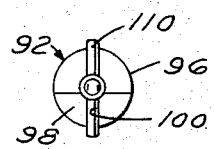

FIGURE 3, an end elevation of an operating part of the valve taken on line 3—3 of FIGURE 2.

Figure 4:
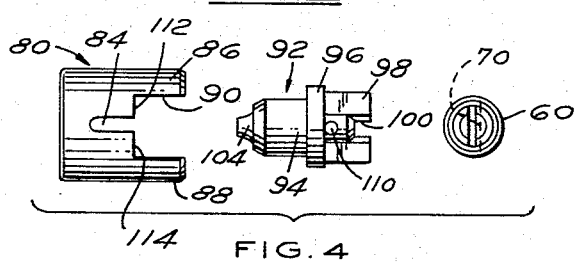

FIGURE 4, a view of the exploded parts of FIGURE 2 at a 90° angle to the plane of FIGURE 2.

Figure 5:
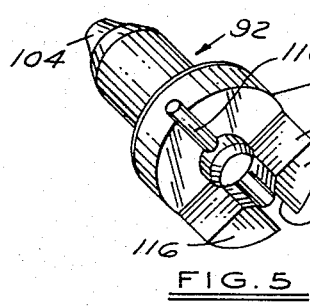

FIGURE 5, a perspective view of the valve actuator plug.

Referring to the drawings: A valve support block 20 includes a housing 22 for fluid conduits 24, 26 and a valve housing 28 is positioned adjacent the block 20. This valve housing is provided with a longitudinal bore which contains a sleeve 30 suitably ported to cooperate with openings 32, 34 and 36 in the valve housing. Within the sleeve 28 is a valve spool 38 having an operating stem 40. The valve spool is urged to the right as viewed in FIGURE 1 by a spring 42 seated in a suitable end cap 44 in the end of the bore.

It will be seen that the valve spool 38 can accomplish its function by being moved from an end position as shown in FIGURE 1 where it connects ports 34 and 36 to an end position to the left where it closes off port 36 and connects ports 32 and 34. Other intermediate positions may be desirable in some installations. This shifting is accomplished by the mechanism shown at the right-hand end of FIGURE 1 wherein a small hollow block housing 50 is joined to the valve housing 28 by holding screws which are not shown. An O-ring 52 seals the contacting surface of the block 50 to the end of the housing 28. The housing has a neck portion 54 which, if desired, can be provided with a collar bushing 56. The bore in the neck portion 54 extends through the housing transversely and in this bore surrounded by a bushing is an actuator shaft 60 which may have two grooves containing O-rings 62 and 64 at each end to provide a seal for the shaft 60 while permitting it to rotate. The short end of the bore opposite the neck 54 may also be sealed by a sheet plug 65. The shaft 60 has an ensmalled end 66 on which a lever 68 is clamped for actuation of the shaft.

It will be seen that the shaft has a large axially extending notch 70 which extends about two-thirds of the diameter leaving a one-third segment remaining. The chordal surface of the notch 70 serves as a cam or actuating surface for parts to be described. The housing 50 also has a blind hole in the form of a center bore 72 perpendicular to and intersecting the bore in which shaft 60 is located and which aligns with an enlarged portion 74 of the bore in the housing 28. Interposed between and around the shaft 60 and the actuating stem 40 of valve 38 are some actuating parts shown best in FIGURES 2 and 4. A hollow cylindrical housing in the form of a sleeve cup 80 has an opening 82 in the bottom of the cup with opposed relatively narrow slots 84 in the side walls of the cup. The side walls are extended in two bifurcate segmental portions 86 and 88 so that the spaces between the segmental portions form relatively wide notches 90 directly outside the slots 84. The portions 86, 88 slip to either side of actuator shaft 60 to orient the cup relative to the shaft and the housing 50.

Positionable within the cup sleeve 80 is a part which in assembly may be referred to as an operating plug 92 which is composed of a thimble-like part having a nose portion 94 with an enlarged body portion 96 having a segmental extension 98 provided with an axial notch 100. The segmental portion 98 extends slightly less than one-half way across the body portion 96. In the nose portion 94 and extending axially of the plug 92 is a spring-pressed pin 102 having an enlarged projecting head portion 104 and a shaft extending through the plug to a point beyond the body portion 96. A spring 106 acts against a shoulder on the projection 104 at one end and against a small flange 108 at the other end to bias the pin 102 to its outward position.

Thus, as viewed in FIGURE 1, for example, the pin 102 is urged to the left and it is limited in its motion by a cross pin 110 which passes through a hole in the end of the pin. As the parts are viewed in FIGURE 1, the cross pin orients the plug circumferentially relative to cup 80 as it is positioned parallel to and against the chordal flats of the segmental portion 98 of the actuating plug 92. On the other hand, in FIGURES 2, 3 and 4, the cross pin 110 is positioned 90° from the aforesaid position transversely of the body portion 96 with one portion extending through the axial slot 100 and thus orients the plug for a purpose to be described. Also in FIGURE 1, there is shown a spring 111 bearing at one end against the end of an enlarged bore in housing 28 and at the other end against the bottom of the sleeve cup 80, the latter being axially movable as will be later described.

In the operation of the device, it will be seen that the parts as viewed in FIGURE 1 can be shifted to actuate the valve spool 38. For example, if the lever 68 is turned in a counterclockwise direction looking down on the assembly, the chordal surface 70 strikes a shoulder 112 on the cup sleeve 80 and also strikes the flat end 116 (FIG- URE 5) of the chordal portion 98 of the operating plug 92 so that both the cup sleeve 80 and the plug 92 will move to the left against spring 111 and the nose of the pin 102 will contact the operating stem 40 and shift valve 38 to the left. The actuating surface 116 on the chordal portion 98 is contacted by one edge of the chordal portion 70 to shift the actuating plug 92 along with the sleeve cup 80. When the lever 68 is, on the other hand, moved in a clockwise direction, it will contact the opposite shoulder 114 on the cup sleeve 80 but will not contact the actuator plug 92 by reason of the removed segment. Thus, the valve will be actuated for only one rotative motion of the lever 68. In addition, of course, the spring connection between the pin 102 and the actuator plug 92 means that there may be overtravel on the part of the actuating mechanism which will be absorbed by the spring 106 without causing any damage to the valve part itself. Spring 106 is necessarily stronger than the biasing spring 42 acting on the valve spool 38.

If, however, it is desirable to have operation by clockwise actuation of the lever rather than counterclockwise, it is accomplished simply by a 180° rotation of the entire assembly of the sleeve cup 80 and the included actuator plug 92 in the bore of the block 50. Under these circumstances, clockwise actuation of the lever will shift the parts to the left and counterclockwise motion will have no effect. Thus, by a simple rotation of the parts in the assembly, the actuation can be controlled from the point of view of direction.

It will be seen also, that if it would be desirable to rotate the block 50 to any particular quadrant, the direction of operation can still be controlled as desired. In other words, the lever 68 might be on the bottom as viewed in FIGURE 1 or on the far side or the near side and the rotation would still be optional as desired.

If, on the other hand, the pin 110 is slipped outwardly from its position and shifted so that one end of it falls within the notch 100, that is, 180° away from the position shown in FIGURE 1, the operation of the device will be different. Under these circumstances, as shown in FIGURES 2 to 5, the segmental surface 70 will, regardless of its direction, contact one side or the other of the segmental portion 98 and thus the assembly will be actuated regardless of the rotational direction of the actuating shaft 60. In terms of cam operation, for example, it might be desirable to have the valve actuated as the cam passes in one direction and then the other. This position of the parts which is shown in FIGURES 2, 3 and 4 will accomplish this purpose.

Here again, it will be seen that the actuating assembly can be rotated to any quadrant with respect to the valve housing 28 and still function to actuate the valve, and here also protection against overtravel is provided by the spring-pressed relationship between the pin 102 and the actuator plug 92.

It will be recognized, of course, also that the lever 68 can be positioned at any particular rotative orientation with respect to shaft 60 to increase the versatility of the mount. The lever is preferably held on to the shaft 60 by a frictional engagement which permits this adjustment. In general, it is preferable that the valves be designed so that the parts will crack, that is, open slightly at about 12 to 15° and fully open from 25 to 30°. The lever may have a 70° full travel but the spool will stop at any place it is designed to stop and the operating mechanism will absorb overtravel; thus, as above described, damage is avoided in the event of a cam being improperly set.

In addition, the structure is such that the interior of the valve is well sealed at the actuator end to prevent the entry of dirt and grime or foreign substances, thus insuring a clean valve operation at all times.

What is claimed as new is as follows:

1. A rotary control for a valve intended to have lineal motion along an axis in a valve housing to operative positions which comprises a control housing adapted to be operatively related to a valve housing, an actuator shaft mounted in said control housing transversely of the axis of motion of the valve to be controlled, a cam surface on said shaft, and means to be actuated by said cam surface comprising an operating plug adapted to be interposed between said cam surface and a valve to be actuated having an end to extend toward said valve in the direction of the axis of motion and an end shaped as chordal segment to underlie said cam surface, and means to orient said plug in one of two positions circumferentially to obtain axial motion of said plug upon clockwise or counterclockwise rotation of said shaft selectively and alternately, and in a third position to obtain axial motion of said plug upon both clockwise or counterclockwise rotation of said shaft.

2. A control as defined in claim 1 in which the cam surface on said shaft comprises a chordal surface extending substantially diametrically of said shaft, and said control housing is adapted to be sealed on a valve housing, the shaft having means to seal it in relation to said control housing.

3. A device as defined in claim 1 in which the means to orient said plug comprises, a hollow cylindrical housing surrounding said plug and slidable in a bore in said control housing and having an axially extending portion positionable on one side of said actuator shaft.

4. A device as defined in claim 3 in which the means to orient said plug further comprises a radially extending means engageable with one of said housings while axially movable in relation thereto.

5. A device as defined in claim 1 in which the plug includes a spring biased plunger with a nose portion projecting toward a valve to be operated.

6. A device as defined in claim 3 in which the plug includes a spring biased plunger with a nose portion at one end projecting toward a valve to be operated and a cross-pin spaced from said one end engageable with a portion of said plug to retain said plunger in said plug.

7. A device as defined in claim 3 in which the plug includes means radially engageable with said hollow cylindrical housing while axially movable in relation thereto.

8. A device as defined in claim 3 in which the plug includes means radially engageable therewith in one of two selective positions 90° apart circumferentially and radially engageable with said hollow cylindrical housing while axially movable in relation thereto.

9. A device as defined in claim 6 in which said cross pin is engageable with said plug in one of two positions 90° apart circumferentially, and said cross pin extends radially to engage an axial slot in the wall of said hollow cylindrical housing to orient the plug relative to the assembly.

10. A valve combination in which a valve is positioned for lineal movement to a variety of operative positions between two end positions and biased toward one of said end positions, comprising a valve housing, a valve axially movable in said housing, an actuator housing mounted on said valve housing in one end thereof substantially in line with the axis of said valve in said housing, an actuator shaft in said actuator housing disposed on an axis transverse to the axis of direction of said valve, said shaft having an axially extending notch therein leaving a segmental portion with a chordal actuating surface thereon, a sleeve cup member slidably disposed in said actuator housing biased to a position within said housing by a spring interposed between said valve housing and said sleeve cup, said sleeve cup having bifurcate portions straddling said actuating shaft, and chordal surfaces at the edge of said cup adapted to be contacted by the chordal surface of said shaft and cammed away from said shaft by rotation thereof, and a valve actuator plug slidably disposed within said sleeve cup comprising a thimble-like member having a spring-pressed plunger disposed therein with a projecting nose portion for connecting the end of a valve, a cross pin at the other end of said plunger projecting therethrough for retaining said plunger, said thimble-like member having an end portion within said sleeve cup provided with a chordal extension extending axially beyond said pin and including approximately one-third of the diameter of said member, said chordal portion having a slot to receive said cross pin selectively at 90° to a position parallel to said chordal extension and being adapted to be contacted in one quadrant by one edge of said chordal actuating surface of said shaft in one direction of rotation and shiftable to a position 90° away from the original position wherein both sides of said chordal portion on the opposite sides of said slot will be contacted by the respective edges of the chordal surface of said actuating shaft when said shaft is moved selectively in a clockwise or counterclockwise position.

No references cited.

M. CARY NELSON, *Primary Examiner.*

R. J. MILLER, *Assistant Examiner.*